United States Patent [19]

Gerritsen et al.

[11] E Patent Number: Re. 33,592

[45] Reissued Date of Patent: May 21, 1991

[54] COLOR DISPLAY TUBE WITH REDUCED DEFLECTION DEFOCUSSING

[75] Inventors: Jan Gerritsen; Johannes C. J. Aerts, both of Eindhoven, Netherlands

[73] Assignee: U.S. Philips Corporation, New York, N.Y.

[21] Appl. No.: 402,001

[22] Filed: Aug. 31, 1989

Related U.S. Patent Documents

Reissue of:

[64] Patent No.: 4,742,279
Issued: May 3, 1988
Appl. No.: 2,065
Filed: Jan. 12, 1987

[30] Foreign Application Priority Data

Jan. 21, 1986 [NL] Netherlands ..... 8600117

[51] Int. Cl.[5] ..... H01J 29/58

[52] U.S. Cl. ..... 315/382; 315/15; 313/414; 313/449

[58] Field of Search ..... 315/14, 15, 382; 313/414, 449

[56] References Cited

U.S. PATENT DOCUMENTS

| | | | |
|---|---|---|---|
| 4,334,169 | 1/1982 | Takenaka et al. | 315/15 |
| 4,383,199 | 5/1983 | Washino et al. | 315/15 |
| 4,473,775 | 9/1984 | Hosokoshi et al. | 313/449 |
| 4,560,910 | 12/1985 | Midland | 315/382 |
| 4,626,738 | 12/1986 | Gerlach | 313/449 |

*Primary Examiner*—Theodore M. Blum
*Attorney, Agent, or Firm*—Robert J. Kraus

[57] ABSTRACT

Color display tube comprising an electron gun 5 of the in-line type. The electron gun 5 comprises a main lens which is constituted by a first focussing electrode 25 and a second focussing electrode 26. The first focussing electrode comprises sub-electrodes 27, 28 placed at a distance from each other between which an auxiliary electrode constituting an astigmatic element $G_{AST}$ is positioned. The auxiliary electrode $G_{AST}$ is connected during operation to means for applying a constant voltage, whilst at least the sub-electrode 28 forming part of the main lens is connected during operation to means for applying a control voltage. The control voltage may be a static voltage or a dynamically varying voltage, for example, a parabolic voltage which is in synchronism with the line deflection.

22 Claims, 4 Drawing Sheets

COLOR DISPLAY TUBE WITH REDUCED DEFLECTION DEFOCUSSING

Matter enclosed in heavy brackets [ ] appears in the original patent but forms no part of this reissue specification; matter printed in italics indicates the additions made by reissue.

BACKGROUND OF THE INVENTION

The invention relates to a colour display tube comprising an evacuated envelope with a rear part and a front part which comprises a display window. The rear part accommodates an electron gun system with which three electron beams whose axes are located in one plane are generated and are focussed by means of a focussing lens field on a display screen which is provided on the inside of the display window. The focussing lens field is produced by a first focussing electrode remote from the display screen and a second focussing electrode facing the display screen of the electron gun system. The first and second focussing electrodes are connected during operation to means for applying a first focussing voltage and a high voltage, respectively. Such a display tube is of a conventional type.

In a cathode ray tube it is often desired to focus an electron beam in, for example, the horizontal direction more strongly than in the vertical direction. This may be necessary, for example, to compensate for astigmatism of the deflection coil or of electron lenses in the tube. This is necessary, inter alia, in colour display tubes having three electron beams located in one plane and a self-convergent deflection coil. Such a deflection coil exerts a converging influence on the separate electron beams in a direction perpendicularly to the plane through the electron beams. The vertical overfocussing which thereby occurs cannot be sufficiently compensated with static means, notably in high resolution colour display tubes, owing to the ever stricter requirements imposed on the definition.

U.S. Pat. No. 4,366,419 describes a main lens construction for a non-integrated in-line colour gun accommodating a system of electrodes for (dynamically) counteracting deflection defocussing. However, this system cannot be used without any further measures in integrated guns.

SUMMARY OF THE INVENTION

It is an object of the present invention to correct the vertical overfocussing in a simple and effective manner in an integrated colour gun.

According to the invention a colour display tube of the type described in the opening paragraph is characterized in that the first focussing electrode comprises a front and a rear sub-electrode, the front sub-electrode adjoining the second focussing electrode, and an auxiliary electrode which is provided with apertures for passing the electron beams and which constitutes an astigmatic element. The auxiliary electrode adjoins the side of the front sub-electrode remote from the display screen and is connected during operation to means for applying a constant voltage, whilst at least the front sub-electrode is connected during operation to means for applying a control voltage.

The invention is based on the recognition that correction of the vertical overfocussing is possible by using an extra electrode and only one control voltage.

The control voltage may be a fixed (static) voltage. Its value may be such that an optimum spot shape is produced in the centre of the display screen. Alternatively, the value may be such that an optimum spot shape is produced in the corners. If a compromise is desired, a value between the two aforementioned values may be chosen. In addition the control voltage may be set to eliminate small differences caused during the series production of the tubes.

Instead of a fixed voltage the control voltage may be a dynamically varying voltage. It is then possible to optimise the spot shape in all areas of the display screen.

The (dynamically varying) control voltage may be applied to the two sub-electrodes. As the triode part of the gun is then influenced too, the amplitude of this control voltage should be chosen to be relatively small (for example, 300 V). A varying voltage on the triode part results however in the beam aperture angle being modulated, which cannot always be tolerated. An alternative is to apply the (dynamically varying) control voltage to only the front sub-electrode (which forms part of the main lens). In that case a considerably higher amplitude (for example, 600 V) should be chosen as then the triode part is not influenced. In the latter case the sensitivity of the system is smaller. If the (dynamically varying) control voltage is only applied to the front sub-electrode, it is practical to apply a same fixed voltage to the rear sub-electrode and the auxiliary electrode. It is then particularly possible to have a fixed connection between the auxiliary electrode and the rear sub-electrode.

A suitable variation of the dynamically varying control voltage is obtained if it comprises a parabolic component which is in synchronism with that deflection voltage which produces deflection in the direction in which the deflection unit has the largest astigmatism component. In practice this direction usually is the line deflection direction.

A further possibility is for the dynamically varying voltage to comprise a combination of parabolic components which are in synchronism with the line deflection and with the field deflection, respectively.

BRIEF DESCRIPTION OF THE DRAWING

Some embodiments of the invention will now be described in greater detail by way of example with reference to a drawing in which:

FIG. 7 illustrates the relation between the anode voltage $V_a$ at $G_4$ and the voltage $V_{G3}$ at $G_3$ at a fixed voltage $V_{AST}$ at the auxiliary electrode in the case of the gun of FIG. 6a.

DESCRIPTION OF THE PREFERRED EMBODIMENTS

Figure 1:
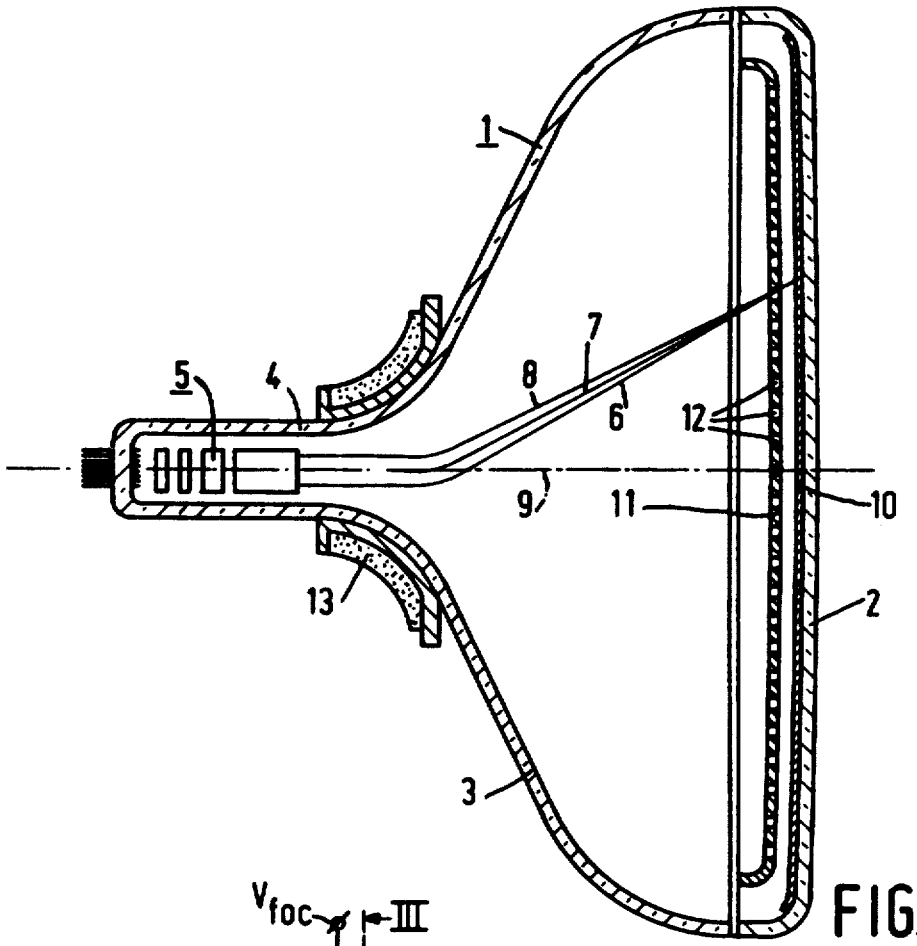
FIG. 1 is a longitudinal section of a colour display tube according to the invention.

FIG. 1 shows a colour display tube of the "in-line" type in a longitudinal section. In a glass envelope 1, which is composed of a display window 2, a cone 3 and a neck 4, this neck accommodates an integrated electron gun system 5 which generates three electron beams 6, 7 and 8 whose axes are located in the plane of the drawing. The axis of the central electron beam 7 initially coincides with the tube axis 9. The inside of the display window 2 is provided with a large number of triplets of phosphor elements. The elements may consist of lines or dots. Each triplet comprises an element consisting of a blue luminescing phosphor, an element consisting of a green luminescing phosphor and an element consisting of a red luminescing phosphor. All triplets combined constitute the display screen 10. Positioned in front of the display screen is the shadow mask 11 in which a large number of elongated apertures 12 are provided through which the electron beams 6, 7 and 8 pass, each impinging only on phosphor elements of one colour. The three co-planar electron beams are deflected by the system of deflection coils 13.

Figure 2:
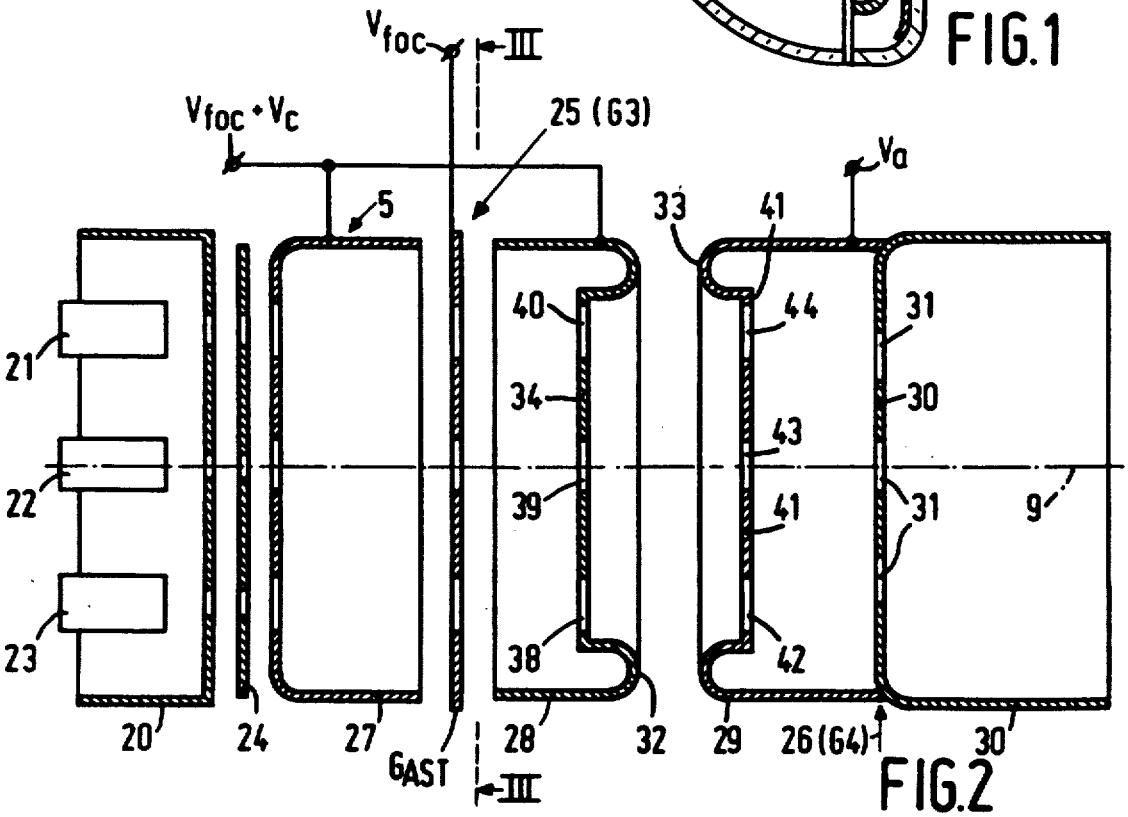
FIG. 2 is a longitudinal section of an electron gun system including an auxiliary electrode as used in the colour display tube of FIG. 1.

FIG. 2 is a longitudinal section of the electron gun system as used in the colour display tube according to FIG. 1. The electron gun system comprises a common cup-shaped electrode 20, in which three cathodes 21, 22 and 23 are secured, and one common plate-shaped screen grid 24. The three electron beams whose axes are located in one plane are focussed with the aid of the focussing electrodes 25 (G3) and 26 (G4) which are common for the three electron beams. Electrode 25 consists of two cup-shaped parts 27 and 28 whose open ends face each other. The main lens, which is thus constituted by a first focussing electrode G3 and a second focussing electrode or anode G4, may be of a conventional type or of, for example, the polygon type. The latter type is described in EP-A No. 134,159 corresponding to U.S. Pat. No. 4,626,738.

Figure 3:
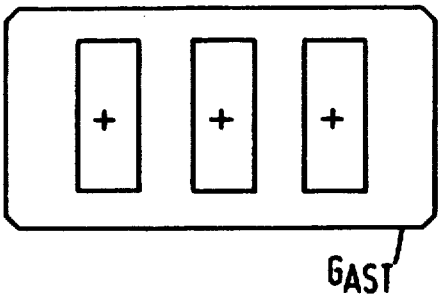
FIG. 3 is an elevational view of the auxiliary electrode of the electron gun system of FIG. 2.

In this embodiment an extra auxiliary electrode $G_{AST}$, which constitutes an astigmatic element, is provided in an insulated manner as a flat plate having elongated apertures at some distance from the main lens, approximately halfway between the cup-shaped parts 27 and 28 of electrode G3. The apertures may have any shape which leads to the production of a quadripolar field, for example, a rectangular shape (as is shown in FIG. 3), an oval shape or diamond shape. The potential of the auxiliary electrode is chosen to be approximately equal to that of G3 (the use of an auxiliary electrode in G4 is less practical because then there are two electrodes in the tube having a very high, slightly different voltage).

As there is no need of any area-dependent dynamic focussing in a self-convergent system in the horizontal direction, the total focussing action in the horizontal direction of the astigmatic element and the main lens combined should remain constant, independent of the influence on focussing for the vertical direction, which influence is brought about by the control voltage.

Figure 4:
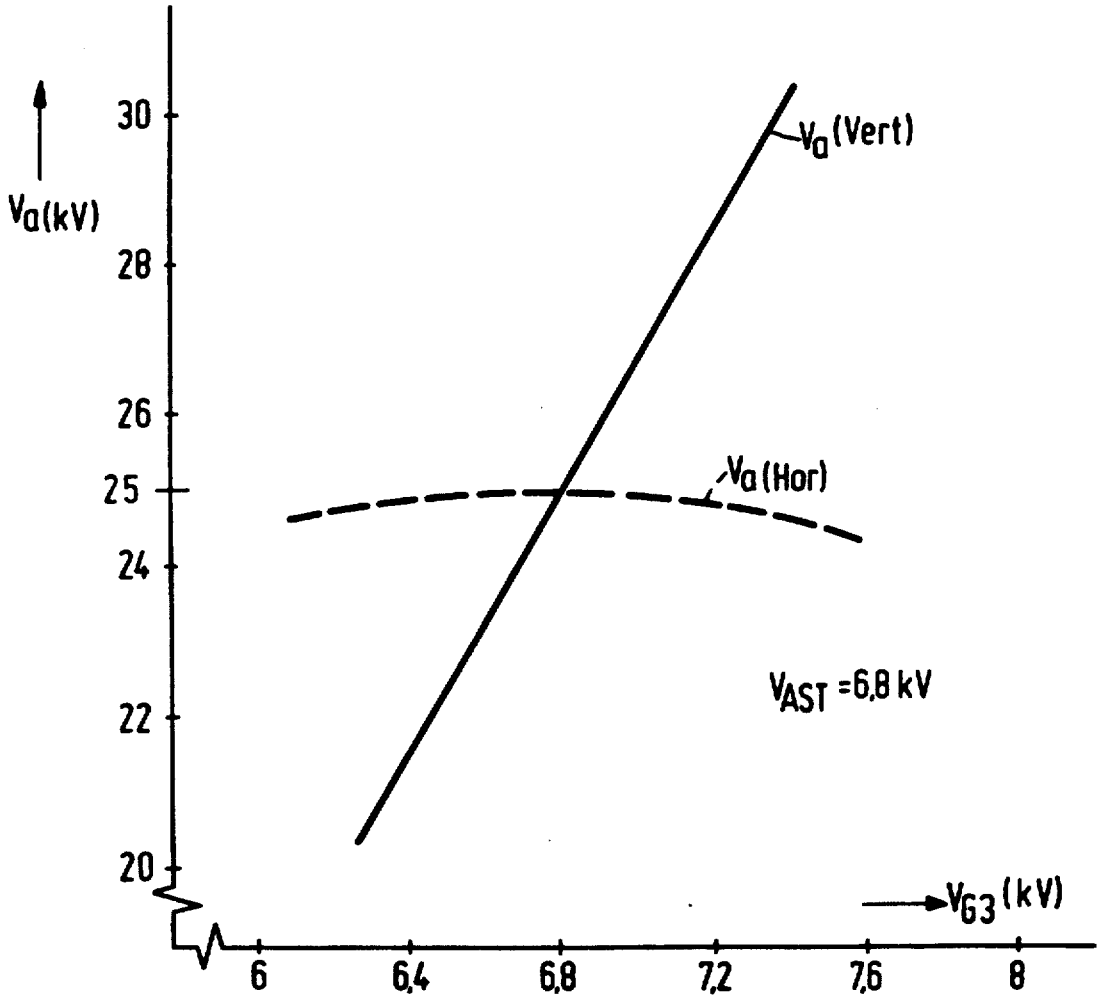
FIG. 4 illustrates the relation between the anode voltage $V_a$ at $G_4$ and the voltage $V_{G3}$ at $G_3$ at a fixed voltage $V_{AST}$ at the auxiliary electrode in the case of the gun of FIG. 2.
Figure 5:
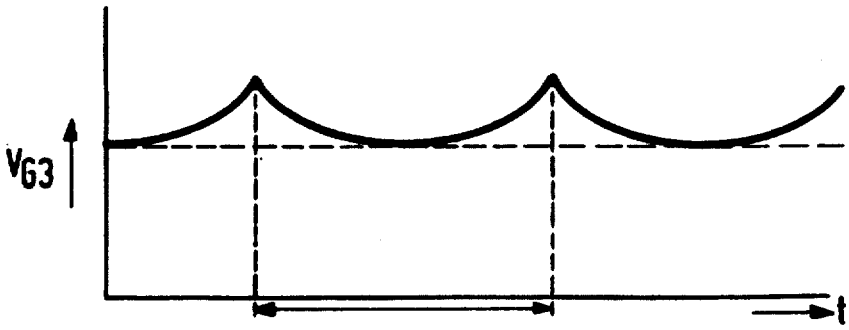
FIG. 5 shows an example of a dynamically varying voltage at $G_3$.

This means that in FIG. 2 the control voltage $V_c$ should not be applied to the astigmatic element $G_{AST}$ because focussing in the horizontal and vertical directions would then be influenced in opposite ways. If on the other hand the control voltage $V_c$ is applied to the focussing electrode G3, both the strength of the main lens and the strength of the quadripolar field constituted by the astigmatic element within G3 are simultaneously influenced. It is then found to be possible to dimension the axial position, the strength and the direction of this quadripolar field in such a manner that the total focussing does not change in the horizontal direction because the actions of the main lens and the quadripole eliminate each other. Both actions amplify each other in the vertical direction. This situation is illustrated by means of a measurement as is shown in FIG. 4. The anode voltage $V_a$ at G4 is plotted against that for G3 at a fixed voltage at $G_{AST}$ and on the condition that the spot remains focussed in the horizontal and vertical directions, respectively. It is found that $V_a$(hor.) is substantially independent of $V_{G3}$ in the case of a correct dimensioning. Since the total vertical lens strength must become weaker towards the corner of the picture, the polarity of the dynamic signal at G3 must be such in the case of dynamic correction that the voltage increases upon deflection. The dynamic signal may be, for example, parabolic and in synchronism with the line deflection (see FIG. 5).

The correct polarity of the quadripolar field can be achieved by choosing vertical slots in FIG. 2 in the astigmatic element $G_{ast}$. The correct strength can be achieved by the shape of the slots and the thickness of the plate constituting the astigmatic element, together with the axial position, because the quadripolar lens strength must be in the correct ratio to the focal distance. When, for example, $G_{AST}$ is too close to the main lens and/or when the configuration of the apertures is chosen to be incorrect, it is found that $V_a$ (hor.), for example, is no longer independent of $V_{G3}$.

A side effect of applying a control voltage to the entire G3 is that also the strength of the pre-focussing lens varies. This can be prevented by applying the control voltage only to part 28 of G3 (the part of G3 forming part of the main lens). Part 27 of G3 (the part of G3 between the triode and $G_{ast}$) may then be at a fixed voltage, together with $G_{ast}$. A combination of axial position and dimensioning of $G_{ast}$ can then also be found, whilst the horizontal focussing is not influenced by variations of the voltage at part 28 of G3. This embodiment is shown in FIG. 6a in which the same reference numerals as those in FIG. 2 have been used for the same components.

In order to achieve the optimum effect, the auxiliary electrode $G_{ast}$ is located closer to the main lens in this case than in the case shown in FIG. 2.

Figure 6A:
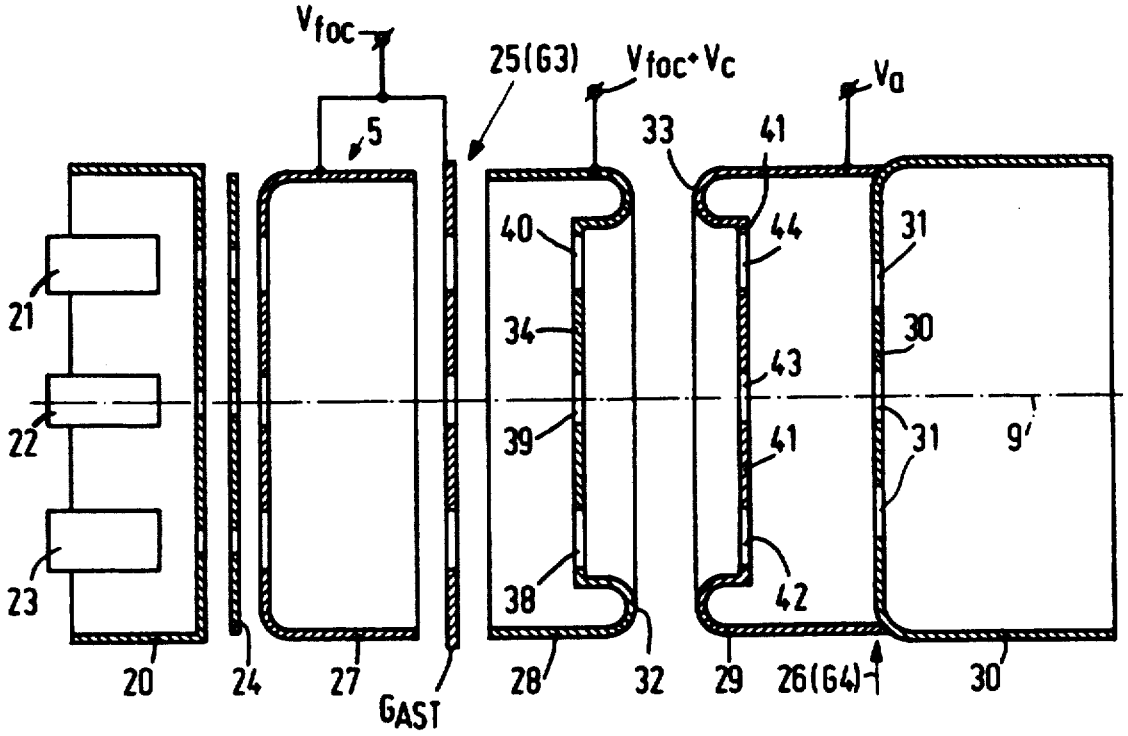
FIG. 6a is a longitudinal section of a first alternative embodiment of the electron gun system of FIG. 2.
Figure 7:
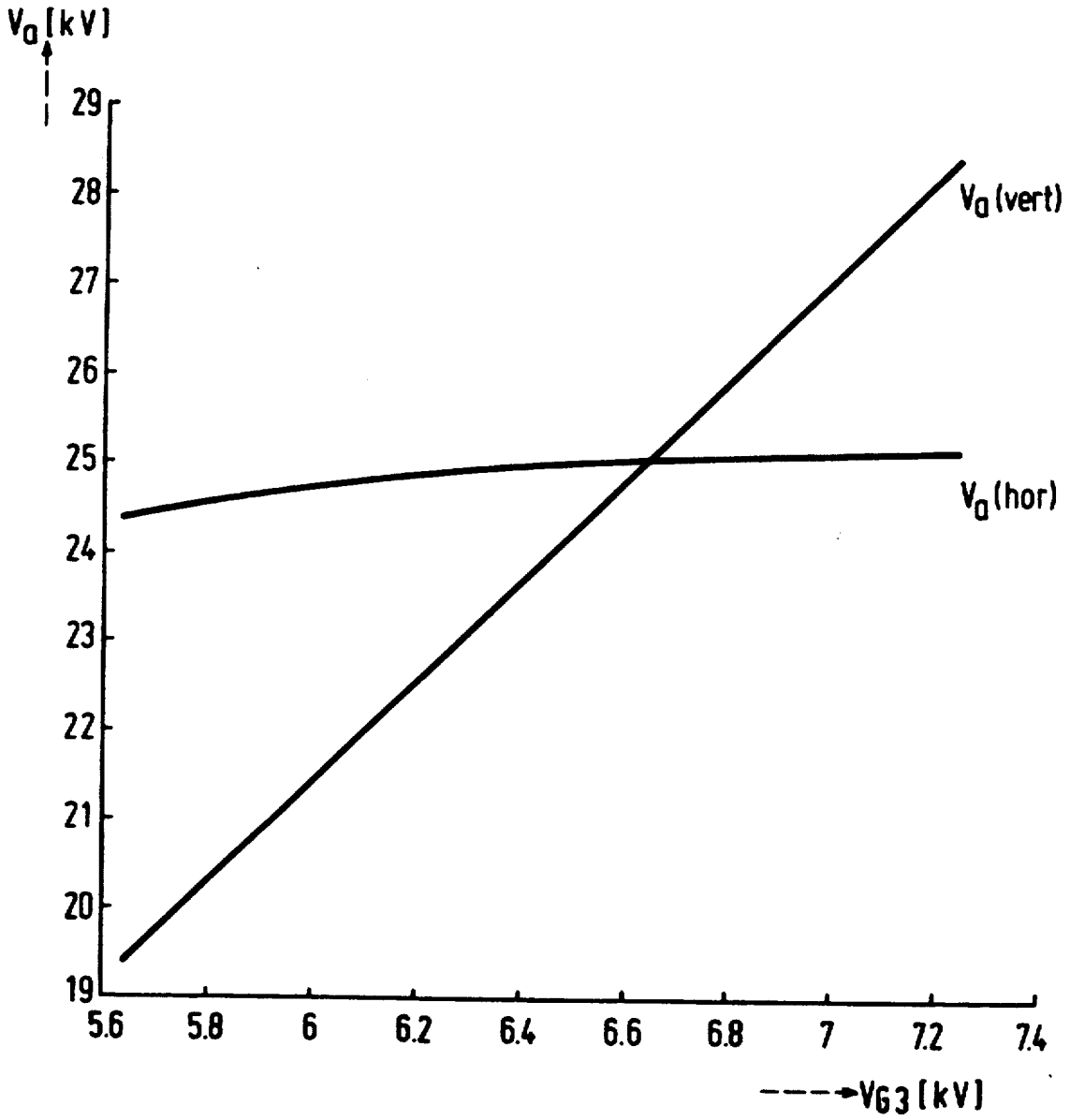

FIG. 7 shows a measurement which is characteristic of the embodiment of FIG. 6a and is analogous to the measurement whose results are shown in FIG. 4.

Figure 6B:
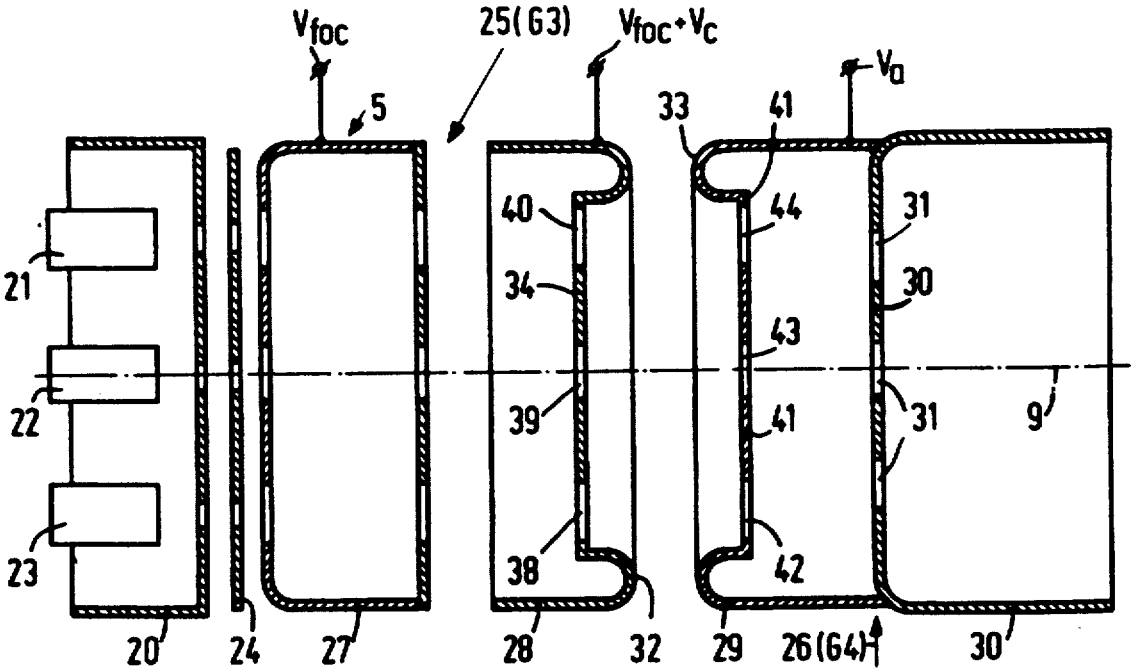
FIG. 6b is a longitudinal section of a second alternative embodiment of the electron gun system of FIG. 2.

FIG. 6b shows an embodiment which is a variant of the embodiment shown in FIG. 6a. The auxiliary electrode $G_{AST}$ has a fixed connection with the sub-electrode 27 in this case.

Experiments have shown that the above described embodiments yield eminent results. The spot is focussed to an optimum extent both horizontally and vertically in all areas on the screen in the case of correct dynamic operation.

FIG. 2 shows the following details. The invention is, however, not limited to the embodiment of FIG. 2. Electrode 27 has one cup-shaped part 29 and a centering bush 30 whose bottom has apertures 31 through which the electron beams pass. Electrode 25 has an outer edge 32 extending to electrode 26 and electrode 26 has an outer edge 33 extending to electrode 25. Apertures 38, 39 and 40 are provided in the recessed part 34 which extends perpendicularly to the axes 35, 36 and 37 of the electron beams 6, 7 and 8. Apertures 42, 43 and 44 are provided in the recessed part 41 which extends substantially perpendicularly to the axis 36 of the central electron beam. The recessed parts 34 and 41 form one assembly with parts 28 and 29, respectively.

Dependent on the gun design, the electron beams for the convergence may be bent towards each other, either in the focussing lens or in the lens field between electrodes 24 and 27.

What is claimed is:

1. A color display tube comprising an envelope containing a luminescent screen, and an electron gun for producing deflectable central and first and second outer in-line electron beams directed toward said screen, characterized in that said electron gun comprises, in succession:

a. a plurality of in-line cathodes for emitting respective ones of the electron beams;

b. first electrode means including a first prefocusing electrode having central and first and second outer apertures for passing the respective electron beams;

c. second electrode means including a plurality of discrete electrodes each having central and first and second outer apertures for passing respective ones of the electron beams, said electrodes including:

(1) a second prefocusing electrode disposed adjacent the first prefocusing electrode, upon application of respective voltages thereto said prefocusing electrodes producing therebetween a prefocusing lens field for prefocusing the electron beams;

(2) a first main-focusing electrode disposed remotely from the first electrode means; and (3) an auxiliary electrode disposed between the second prefocusing electrode and the first main-focusing electrode, the central and first and second outer apertures in the auxiliary electrode being shaped to produce a quadripolar field for astigmatically affecting the cross-sectional shapes of the electron beams; and d. third electrode means including a second main-focusing electrode disposed adjacent the first main-focusing electrode and having central and first and second outer apertures for passing respective ones of the electron beams, upon application of respective voltages thereto said main focusing electrodes producing therebetween a main focusing lens field for focusing the electron beams onto the screen;

during operation, said auxiliary electrode having applied thereto a constant voltage and at least said first main-focusing electrode having applied thereto a variable control voltage, variation of said control voltage affecting the astigmatism of the electron beams in a first direction substantially independently of said astigmatism in a direction perpendicular to said first direction.

2. A color display tube as *set forth* in claim 1 where the variable [color] *control* voltage is set at a constant value.

3. A color display tube as in claim 1 where the control voltage varies dynamically with the deflection of the beams across the screen.

4. A color display tube as in claim 3 where the control voltage has a parabolic component which is in synchronism with a line deflection voltage for deflecting the electron beams.

5. A color display tube as in claim 3 where the control voltage includes a combination of parabolic components which are in synchronism with line deflection and field deflection of the electron beams.

6. A color display tube as in claim 1 where, during operation, the variable control voltage is applied to both the second prefocusing electrode and the first main-focusing electrode.

7. A color display tube as *claimed* in claim 1 where, during operation, the variable [color] *control* voltage is applied to only the first main-focusing electrode.

8. A color display tube as in claim 7 where, during operation, the constant voltage is applied to the second prefocusing electrode and the auxiliary electrode.

9. A color display tube as in claim 8 where the auxiliary electrode is affixed to the second prefocusing electrode.

*10. A color display tube comprising an envelope containing a luminescent screen, and an electron gun for producing deflectable central and first and second outer in-line electron beams directed toward said screen, characterized in that said electron gun comprises, in succession:*

*a. a plurality of in-line cathodes for emitting respective ones of the electron beams;*

*b. first electrode means including a first prefocusing electrode having central and first and second outer apertures for passing the respective electron beams;*

*c. second electrode means including:*

*(1) a second prefocusing electrode, having central and first and second outer apertures for passing respective ones of the electron beams, disposed adjacent the first prefocusing electrode, upon application of respective voltages thereto said prefocusing electrodes producing therebetween a prefocusing lens field for prefocusing the electron beams;*

*(2) a first main-focusing electrode having central and first and second outer apertures for passing respective ones of the electron beams, disposed remotely from the first electrode means; and*

*(3) four pole field producing means disposed in the vicinity of the second prefocusing electrode and the first main-focusing electrode which, upon application of at least a first voltage, produces a quadripolar field in the region between the second prefocusing electrode and the first main-focusing electrode which quadripolar field astigmatically affects the cross sectional shapes of the electron beams;*

*d. third electrode means including a second main-focusing electrode disposed adjacent the first main-focusing electrode and having central and first and second outer apertures for passing respective ones of the electron beams, upon application of respective voltages thereto said main focusing electrodes producing therebetween a main focusing lens field for focusing the electron beams onto the screen; and*

*e. means for applying a second voltage on at least said first main-focusing electrode so that variation of said second voltage affects the astigmatism of the electron beams in a first direction substantially independent of said astigmatism in a direction perpendicular to said first direction.*

*11. A color display tube as set forth in claim 10 where the second voltage has a constant value.*

*12. A color display tube as in claim 10 where the second voltage varies dynamically with the deflection of the beams across the screen.*

*13. A color display tube as claimed in claim 12 where the second voltage has a parabolic component which is in synchronism with a line deflection voltage for deflecting the electron beams.*

*14. A color display tube as in claim 12 where the second voltage includes a combination of parabolic components which are in synchronism with the line deflection and field deflection of the electron beams.*

*15. A color display tube as in claim 10 wherein the means for applying the second voltage applies the second voltage on both the second prefocusing electrode and the first main-focusing electrode.*

*16. A color display tube as claimed in claim 10 wherein the means for applying the second voltage applies the second voltage only to the first main-focusing electrode.*

*17. A color display tube comprising:*

*an evacuated envelope containing a luminescent screen, and an electron gun for producing deflectable central and first and second outer in-line electron beams directed towards said screen;*

*wherein said electron gun comprises:*

*focusing lens means disposed along paths of said electron beams which include a first focusing electrode remote from the display screen and a second focusing electrode disposed between the first focusing electrode and the display screen, said focusing lens means, upon application of a focusing voltage between said focussing electrodes, producing a focussing lens field therebetween;*

*four-pole field means disposed adjacent the focusing lens means, said four-pole field means, upon application of a voltage thereto, producing a quadripolar electric field within at least a region adjacent the focusing lens field;*

*said electron gun, upon application of a control voltage to at least one of said first and second focusing electrodes which is nearest to said four-pole field means, affecting the astigmatism of the electron beams in a first direction substantially independently of said astigmatism in a direction perpendicular to said first direction.*

*18. A color display tube as set forth in claim 17 where the control voltage has a constant value.*

*19. A color display tube as in claim 18 where the control voltage varies dynamically with the deflection of the beams across the screen.*

*20. A color display tube as in claim 18 where the control voltage has a parabolic component which is in synchronism with a line deflection voltage for deflecting the electron beams.*

*21. A color display tube as in claim 18 where the control voltage includes a combination of parabolic components which are in synchronism with line deflection and field deflection of the electron beams.*

*22. A color display tube as in claim 17 comprising a prefocussing electrode wherein the control voltage is applied both to the prefocusing electrode and to the first focusing electrode.*

* * * * *